United States Patent [19]

Tanaka et al.

[11] Patent Number: 5,541,910
[45] Date of Patent: Jul. 30, 1996

[54] OPTICAL DISK SUBSTRATE AND OPTICAL DISK USING THE SAME

[75] Inventors: Toshifumi Tanaka; Michiki Naganawa; Kazuki Suzawa, all of Nagano, Japan

[73] Assignee: TDK Corporation, Tokyo, Japan

[21] Appl. No.: 430,167

[22] Filed: Apr. 27, 1995

Related U.S. Application Data

[63] Continuation of Ser. No. 13,078, Feb. 3, 1993, abandoned.

[30] Foreign Application Priority Data

Feb. 6, 1992 [JP] Japan ................................ 4-056164

[51] Int. Cl.$^6$ .................................................. G11B 7/24
[52] U.S. Cl. .................................................. 369/290
[58] Field of Search ........................... 369/270, 271, 369/272, 282, 290

[56] References Cited

U.S. PATENT DOCUMENTS

| | | | |
|---|---|---|---|
| 4,634,617 | 1/1987 | Ohta et al. | 369/290 |
| 4,658,393 | 4/1987 | Ohta et al. | 369/290 |
| 4,866,697 | 9/1989 | Yamaguchi et al. | 369/290 |
| 4,877,667 | 10/1989 | Hattori et al. | 369/290 |
| 4,982,399 | 1/1991 | Odawara et al. | 369/290 |
| 5,128,818 | 6/1992 | Koizumi et al. | 369/270 |
| 5,167,996 | 12/1992 | Kurisu et al. | 369/282 |

FOREIGN PATENT DOCUMENTS

| | | |
|---|---|---|
| 0319301 | 6/1989 | European Pat. Off. . |
| 1189064 | 7/1989 | Japan . |
| 1253886 | 10/1989 | Japan . |
| 2203886 | 10/1988 | United Kingdom . |

OTHER PUBLICATIONS

IBM Technical Disclosure Bulletin; vol. 33; No. 8; Jan. 1991; p. 361.

*Primary Examiner*—Stuart S. Levy
*Assistant Examiner*—Paul J. Ditmyer
*Attorney, Agent, or Firm*—Watson Cole Stevens Davis, PLLC

[57] ABSTRACT

An optical disk substrate of resin, comprising a center hole and being composed of an inner circular-projected portion and an outer flat circumferential portion, the inner circular-projected portion having a circular projection projecting from at least one major surface of the substrate, the maximum height of the circular projection measured from the major surface of the outer flat circumferential portion being equal to or larger than 0.5 mm, the optical disk substrate is designed to satisfy the following equation or inequality:

$V/V_0 < 1.5$, where V stands for the volume of the circular-projected portion, and $V_0$ stands for the volume of an annular body having the same radius as the circular-projected portion and the same thickness as the outer flat circumferential portion, and having a center hole of the same size as the center hole.

12 Claims, 2 Drawing Sheets

OPTICAL DISK SUBSTRATE AND OPTICAL DISK USING THE SAME

This application is a continuation application of application Ser. No. 08/013,078, filed 3 Feb. 1993 and now abandoned.

BACKGROUND OF THE INVENTION

1. Field of the Invention

The present invention relates to an improved optical disk substrate and an optical disk using the same.

2. Description of the Prior Art

To detachably attach an optical disk to a drive unit a variety of magnetic type clamps have been widely used.

Japanese Patent Application Kokai No. 1-253886 shows a clamping structure using a clamp plate of a magnetic metal to be fitted in the center hole of an optical disk substrate as shown in FIG. 1 of the publication, and another clamping structure using a resin piece having a magnetic metal piece impregnated, said resin piece being fixed to an optical disk substrate, thereby permitting the optical disk to be attracted and fastened by a magnet piece of the underlying drive unit as shown in FIG. 2 of the publication. As for the former clamping structure clamp plates must be made by press forming. As for the latter clamping structure resin pieces each having a magnetic piece impregnated must be prepared. Thus, these prior art clamping structures require extra work and accordingly extra cost.

FIG. 3 shows still another clamping structure using a flat clamp plate 4 attached to one major surface of the disk substrate. Advantageously this clamping structure can be produced at a reduced cost. The optical disk can be attached to the drive unit in correct position by inserting the spindle of the drive unit in the center hole 3 of the disk substrate 2. Preferably the tip of the spindle is tapered or chamfered to facilitate insertion of the spindle of the drive unit in the center hole of the disk substrate. This, however, causes substantial reduction of the contact area in which the spindle and the inner wall of the center hole come to contact because there remains an annular gap between the tapered tip of the spindle and the inner wall of the center hole of the disk substrate. In an attempt to compensate for such reduced contact area an annular projection of substantial longitudinal extension is integrally connected to the inner circumferential area of the disk substrate 2 as indicated at 23, accordingly extending the center hole 3 longitudinally. Some drive units require extension of an increased distance from the opening end of the center hole 3 to the clamp plate 4, compared with the thickness of the disk substrate, and in this case it is necessary that an annular projection be integrally connected to the inner circumferential area of the disk substrate.

Such hub-attached disk substrates can be injection molded. The inventor found that such injection-molded articles each having a 0.5 mm or more high hub projection cause appearance of increased birefringence of light in the disk substrate, particularly at radially inner portion of the information-bearing section of the disk substrate. Usually a fine beam of light is thrown to the rear side of the optical disk to reproduce the information recorded in the disk. The refraction of light in passing through the disk, however, will be a cause for reducing the quality of reproduction from the optical disk.

SUMMARY OF THE INVENTION

One object of the present invention is to provide an improved optical disk substrate having an annular, hub-like projection projecting 0.5 mm or more high from its inner circumferencial area, having a low birefringence.

Another object of the present invention is to provide an optical disk using such an improved optical disk substrate.

To attain these objects an optical disk substrate of resin, having a center hole and being composed of an inner circular-projected portion and an outer flat circumferential portion, said inner circular-projected portion having a circular projection projecting from at least one major surface of the substrate, the maximum height of said circular projection measured from the major surface of said outer flat circumferential portion being equal to or larger than 0.5 mm, is designed according to the present invention so that it may satisfy the following equation or inequality:

$V/V_0 \leq 1.5$, where V stands for the volume of said circular-projected portion, and $V_0$ stands for the volume of the assumptive annular body having the same radius as said circular projection and the same thicness as said outer flat circumferential portion, and having a center hole of the same size as said center hole.

According to one aspect of the present invention an optical disk substrate may be so designed that it may satisfy the following equation or inequality: $0.4 \leq V/V_0$.

According to another aspect of the present invention an optical disk substrate may be so designed that it may satisfy the following equations or inequalities: 5 mm $\leq r_1 \leq$ 6 mm, and 2 mm $\leq r_2 - r_1 \leq$ 5 mm, where $r_1$ stands for the radius of said center hole, and $r_2$ stands for the radius of said circular projection.

According to still another aspect of the present invention an optical disk substrate may be so designed that it may satisfy the following equation or inequality: 0.5 mm $\leq t \leq$ 1.5 mm, where t stands for the thickness of said outer flat circumferential portion.

According to still another aspect of the present invention the birefringence (double path) of light is equal to or less than 100 nm at which point closer to the center of the optical disk substrate: $(r_2+6)$ mm apart from the center of the optical disk substrate or $(r_2 \times 1.5)$ mm apart from the center of the optical disk substrate, where $r_2$ stands for the radius of the circular projection.

According to still another aspect of the present invention an optical disk comprising an improved optical disk substrate described above is so designed that at least one major surface of the outer flat circumferential area has information-bearing section, and that a clamping plate of a magnetic metal is used to close the center hole.

In such an optical disk the circular projection may project from one major surface of the substrate, and the clamping plate and the information bearing section may be on the other major surface of the substrate.

Such an optical disk may be used as an opto-magnetic recording disk.

The inventor assumed that the cause for increasing the birefringence of light in the resin optical disk substrate (FIG. 3) is an inner distortion caused by an inner stress appearing in the substrate as a result of the delayed hardening of the thick inner circumference area of the optical disk at the time of injection molding. With this idea in mind the inventor made many experiments on a plurality of optical disk substrates having central projections of different sizes and shapes.

The inventor found that the birefringence is reduced to minimum if the volume of the circular-projected portion of the injection-molded body remains within the above prescribed range. The birefringence is liable to increase around the circumference area of the projection, compared with the outer circumference area. According to the present invention, the birefringence can be reduced below 100 nm at the inner circumference area, for example at which point closer to the center of the optical disk substrate: $(r_2+6)$ mm apart from the center of the optical disk substrate or $(r_2 \times 1.5)$ mm apart from the center of the optical disk substrate, where $r_2$ stands for the radius of the circular projection. A 100 nm or less birefringence is permissible to opto-magnetic recording disks. The birefringence is given in terms of the absolute value of double path of light of 630-to-840 nm long wave length.

The present invention will be better understood from the following description of an optical disk substrate according to a preferred embodiment, which is shown in accompanying drawings.

Figure 1:
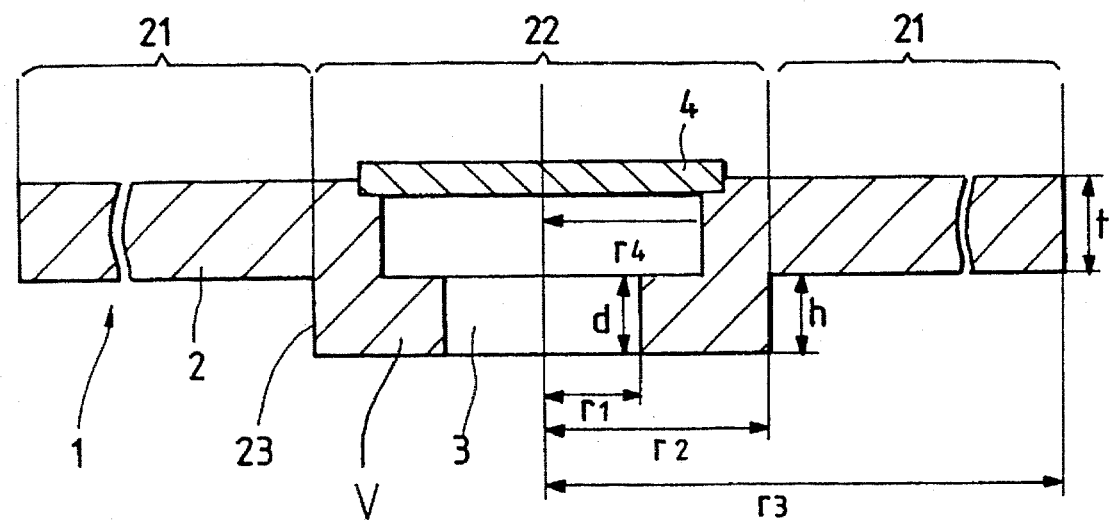
FIG. 1 is a sectional view of an optical disk substrate according to a preferred embodiment.

Referring to FIG. 1, an optical disk 1 has a center hole 3, and is composed of an inner circular-projected portion 22 and an outer flat circumferential portion 21. The circular-projected portion 22 has a circular projection 23 projecting from one major surface of the substrate. It should be noted that the circular-projected portion 22 is not the projection 23 projecting from the major surface of the substrate, but all the circular portion inside the outer flat circumferential portion 21.

The maximum height "h" of the circular projection 23 measured from the major surface of the outer flat circumferential portion 21 is equal to or larger than 0.5 mm. The maximum height of the circular projection 23 is determined according to the prescriptions of particular optical disks and drive units.

As shown in the drawing, the major surface to which the projection 23 is integrally connected is usually flat for assuring the stability in holding the optical disk, but the major surface may have another projections or slots made therein.

According to the present invention the optical disk substrate is designed to satisfy the following equation or inequality:

$V/V_0 \leq 1.5$, and preferably $V/V_0 \leq 1.3$, where V stands for the volume of the circular-projected portion 22, and $V_0$ stands for the volume of an assumptive annular body 20 (See FIG. 2) having the same radius as the circular projection 23 and the same thicness as the outer flat circumferential portion 21, and having a center hole 30 of the same size as the center hole 3. Increase of $V/V_0$ beyond the specified value will cause a sudden increase of the birefringence in the substrate.

Decrease of $V/V_0$ will cause decrease of the axial or longitudinal length of the center hole 3, and accordingly the mechanical strength will be decreased. Also, the contact area between the drive spindle and the substrate will be reduced, and it may be possible that the disk cannot be held in stable condition. In view of these the optical disk substrate is designed to satisfy $0.4 \leq V/V_0$, preferably $0.5 \leq V/V_0$.

The annular wall of the circular projection 23 need not be continuous in its circumference, and it may be slotted diametrically.

The radius $r_1$ of the center hole 3, the radius $r_2$ of the projection 23 and the radius $r_3$ of the substrate 2 may be determined to meet prescriptions. In view that the information bearing area is expanded close to the projection 23 and that the present invention is advantageously applied to small-sized optical disks of increased capacity these radiuses may be preferably determined as follows:

5 mm $\leq r_1 \leq$ 6 mm, 2 mm $\leq r_2 - r_1 \leq$ 5 mm, and 60 mm $\leq r_3 \leq$ 66 mm.

In case that the annular wall of the projection 23 is not perpendicular to the outer flat circumferential portion 21 (or the projection 23 is tapered), the radius $r_2$ of the projection 22 is assumed to be the distance from the center of the substrate to the boundary between the annular wall of the projection 22 and the outer flat circumferential portion 21. Also, in case that the circumference of the center hole 3 is not perpendicular to the major surface of the outer flat circumferential area 21 (or the hole is divergent upward), or in case that the circumference of the center hole 3 has slots made therein, the minimum radius is selected as $r_1$.

The thickness t of the outer flat circumferential portion 21 is usually determined within the following range:

0.5 mm $\leq t \leq$ 1.5 mm.

The disk substrate may have two projections 23 projecting from its opposite major surfaces. Usually it has one projection 23 projecting from one major surface, and a recess in the opposite major surface. The recess may have any desired shape, provided that $V/V_0$ remains in the range prescribed above.

Each major surface may have grooves or pits made for the purpose of tracking or addressing.

The disk substrate may be molded from polycarbonate, polyolefin, acrylic resin, polyester and any other appropriate resins. Polycarbonate, however, is preferable because of its high-transparency, anti-scratch and less expensiveness. Generally polycarbonate is likely to have an increased birefringence, but even if an annular projection is integrally connected to the center area of a polycarbonate substrate, such birefringence can be suppressed by the claimed structure.

The disk substrate 2 can be injection-molded to provide an integral form of inner circular-projected and outer flat portions. Injection molding conditions may be determined appropriately for the quality of materials, disk sizes and other molding factors.

In case that the projection 23 projects from one major surface of the disk substrate, a clamping plate 4 is attached to the other major surface of the disk substrate.

The clamping plate 4 may be made of a metal such as magnetic stainless steel, and it will be attracted by the magnet of the drive unit.

The clamping plate 4 is shown as being flat, but it can have a variety of shapes, such as a cup having an annular collar integrally connected to its open end circumference. This particular shape has the effect of increasing its strength. The cup may have a recess extending toward the drive axle or in the opposite direction. The annular collar may be continuous or may be slotted.

The clamping plate 4 is shown as closing the center hole 3 of the disk substrate, but it may have a throughhole.

Usually the clamping plate 4 may be fixed to the disk substrate by adhesive. It, however, may be fixed to the disk substrate by supersonic fusing or by pressfitting.

The present invention can be applied to every sort of optical disks, for instance optical disks for reproduction only, write-once type optical disks to permit recording, or irrasable optical disks to permit rewriting. The present invention is described as being applied to an optical disk composed of a single substrate sheet, but the present invention may be equally applied to an optical disk using two substrate sheets, or an optical disk using information-bearing substrate sheet and protecting substrate sheet laid on each other.

The information-bearing substrate sheet should be understood as including a substrate sheet having pieces of information already recorded like an optical disk for reproduction only, and a substrate sheet to permit the recording of pieces of information like a recording-and-reproducing optical disk. In FIG. 1, the optical disk bears pieces of information on its upper surface, that is, on the side of clamping plate 4, and a beam of light is thrown to the lower surface of the optical disk, passing therethrough.

The present invention can be equally applied to an optical disk having two substrate sheets laid on each other, and to an air-sandwiched type optical disk having two substrate sheets facing each other, leaving an air gap therebetween.

Among a variety of optical disks the present invention is most suitably applied to an opto-magnetic recording disk.

Pieces of information can be magnetically recorded in the recording layer of the opto-magnetic recording disk by using information-modulated light beam or information-modulated magnetic field, and the pieces of information thus recorded can be reproduced by magnetic-to-optical conversion. Any material which permits the opto-magnetic recording of information may be used in making the recording layers of opto-magnetic recording disks. For instance, such recording layer may be formed in the form of amorphous coating by sputtering, evaporating or ion-plating, most preferably sputtering an alloy containing rare earth metals, particularly a rare earth metal-and-transition metal alloy. Some examples are TbFeCo, DyTbFeCo, NdDyFeCo, and NdGdFeCo. The recording layer may be 10 to 1000 nm thick.

Usually, the optical disk has a laminated structure composed of a lowermost protecting layer, a recording layer, an upper protecting layer, a reflecting layer and a protecting coating laid on each other in the order named.

These protecting layers have the effect of improving C/N and protecting the recording layer against corrosion. Preferably protecting layers may be made of dielectric materials, which may be a variety of oxides, carbides, nitrides, sulfides, and mixtures thereof. These protecting layers may be formed 30 to 300 nm thick according to the gas phase coating such as sputtering, evaporating or ion-plating. It may suffice that one of upper and lower protecting layers be provided, although preferably both protecting layers are provided.

A reflecting layer may be provided when occasions demand. The reflecting layer may be made of Au, Ag, Pt, Al, Ti, Cr, Ni, Co or an alloy or chemical compound thereof. The reflecting layer may be formed in the same way as the recording layer. The reflecting layer may be 30 to 200 nm thick.

The protecting coating may be made of a variety of resins, preferably a radiation cure resin. It may be formed by spin-coating, gravure coating, spray coating or dip coating. Preferably the protecting coating may be 1 to 30 μm thick.

A transparent hard coating may be formed on the side opposite to the recording layer of the disk substrate. The hard coating may be similar to the protecting coating in material and thickness. Such hard coating may be formed on the inner and outer circumference areas of the disk substrate.

EXAMPLES

Optical disk substrates as shown in FIG. 1 were injection-molded of polycarbonate (AD9000TG), which is commercially available from Teijin Kasei.

The particulars of such optical disk substrates are:

$r_1$=5.5 mm $r_2$=8.7 mm $r_3$=32.0 mm $r_4$=7.0 mm ($r_4$ stands for the radius of the circular recess at the center of the disk substrate.)

t=1.2 mm h=0.9 mm

The projections 23 of these optical disk substrates have different thicknesses "d", and accordingly these optical disk substrates have inner circular-projected portions of different volumes "V".

Figure 2:
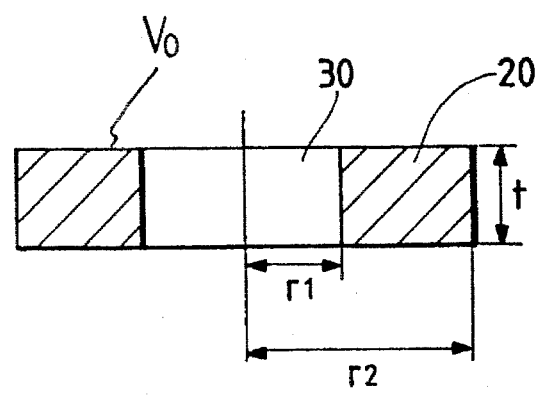
FIG. 2 is a sectional view of an assumptive annular body to determine volume $V_0$.
Figure 3:
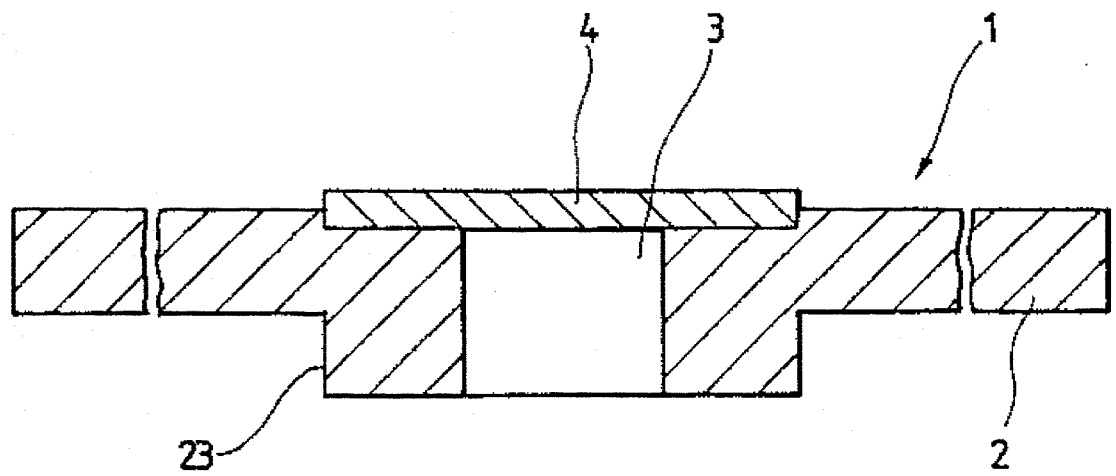
FIG. 3 is a sectional view of a conventional optical disk.

The ratios of $V/V_0$ of these disk substrates are given in the following table. The values of $V_0$ were determined from their assumptive annular bodies as shown in FIG. 2.

| Substrate No. | Thickness (mm) | $V/V_0$ | birefringence (nm) | | |
|---|---|---|---|---|---|
| | | | R = 14.5 mm | R = 20.5 mm | R = 25.5 mm |
| 1 (reference) | 1.6 | 1.58 | −123 | −24 | +12 |
| 2 | 1.2 | 1.44 | −94 | −22 | −6 |
| 3 | 0.8 | 1.30 | −67 | −11 | −4 |

The birefringences of these disk substrates were determined at selected points. The distances R from the center of the substrate to the point at which the measurement were made are given in the table.

The advantages of the present invention will be apparent from the table.

On each disk substrate actually made an SiNx dielectric layer, a TbFeCo recording layer, an SiNx dielectric layer, an Al reflecting layer and a protecting coating were laid in the order named, and finally a clamping plate was attached thereto. Thus, the opto-magnetic recording disks resulted. The dielectric layers, recording layers and reflecting layers were formed by sputtering. The protecting coatings were formed 5 μm thick by applying a composition containing an ultraviolet cure acrylic resin and a photopolymerization starting agent, and by exposing the composition thus applied to ultraviolet light for crosslinking and curing. Clamping disks were made of magnetic stainless steel, and were 15 mm across and 0.3 mm thick. These clamping disks were fixed to the disk substrates by a radiation cure, hot-melting type adhesive agent.

Measurements of C/N and opto-magnetic signals outputted from these opto-magnetic recording disks revealed that these characteristics lower with the increase of the birefringences in the disk substrates.

As may be understood from the above, the birefringence in the information-bearing section of an optical disk having a 0.5 mm or more high projection projecting from its major surface can be substantially reduced according to the present invention.

What is claimed is:

1. An optical disk, comprising a substrate of resin having at least one major surface with a center hole and an inner circular-projected portion and an outer flat circumferential portion, said inner circular-projected portion having a circular projection projecting from said at least one major surface, the maximum height of said circular projection measured from the major surface of said outer flat circumferential portion being equal to or larger than 0.5 mm, wherein the birefringence (double path) of light is equal to or less than 100 nm at the point closer to the center of the optical disk substrate: (r2+6 mm) or (r2×1.5 mm) from the center of said optical disk substrate, where r2 is the radius of said circular projection, and wherein:

$0.4 \leq V/V_0 < 1.5$, where V is the volume of said circular-projected portion, and $V_0$ is the volume of an annular body having the same radius as said circular-projected portion and the same thickness as said outer flat circumferential portion, and having a center hole of the same size as said center hole.

2. An optical disk according to claim 1, wherein 5 mm$\leq$r1$\leq$6 mm, and 2 mm$\leq$r2–r1$\leq$5 mm, and r1 is the radius of said center hole.

3. An optical disk substrate of resin according to claim 1 wherein 0.5 mm$\leq$t$\leq$1.5 mm, where t stands for the thickness of said outer flat circumferential portion.

4. An optical disk according claim 1, wherein said outer flat circumferential portion includes an information-bearing section thereon, and further comprising a clamping plate of a magnetic metal attached to said inner circular-projected portion to close said center hole.

5. An optical disk according to claim 4, wherein said circular projection projects from said at least one major surface of the substrate, and said clamping plate and said information-bearing section are on another major surface of the substrate.

6. An optical disk according to claim 4 wherein said optical disk is an opto-magnetic recording disk.

7. An optical disk according to claim 1, wherein $0.5 \leq V/V_0 < 1.3$.

8. An optical disk according to claim 7, wherein 5 mm$\leq$r1$\leq$6 mm, and 2 mm$\leq$r2–r1$\leq$5 mm, and r1 is the radius of said center hole.

9. An optical disk according to claim 7, wherein 0.5 mm$\leq$t$\leq$1.5 mm, where t is the thickness of said outer flat circumferential portion.

10. An optical disk according to claim 7, wherein said at least one major surface of said outer flat circumferential portion includes an information-bearing section and a clamping plate of a magnetic metal attached to said inner circular-projected portion to close said center hole.

11. An optical disk according to claim 10, wherein said circular projection projects from said at least one major surface of the substrate, and said clamping plate and said information-bearing section are on another major surface of the substrate.

12. An optical disk according to claim 7, wherein said optical disk is an optical-magnetic recording disk.

* * * * *